United States Patent
Fukumura (10) Patent No.: US 7,400,991 B2
(45) Date of Patent: Jul. 15, 2008

(54) CONTACT TYPE DISPLACEMENT METER

(75) Inventor: Koji Fukumura, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 11/614,386

(22) Filed: Dec. 21, 2006

(65) Prior Publication Data
US 2007/0150222 A1    Jun. 28, 2007

(30) Foreign Application Priority Data
Dec. 22, 2005    (JP)    ............... 2005-369115

(51) Int. Cl.
*G06F 19/00*    (2006.01)
(52) U.S. Cl. ............... 702/94; 73/1.79; 73/1.75
(58) Field of Classification Search ............ 702/33–36, 702/38, 57, 85, 94, 95, 97, 104, 105, 108, 702/113, 114, 127, 150–154, 157, 158, 161, 702/166–168; 73/1.01, 1.75, 1.79, 1.81; 33/702, 706; 700/57, 66, 302
See application file for complete search history.

(56) References Cited
U.S. PATENT DOCUMENTS
5,610,846 A * 3/1997 Trapet et al. ............... 702/95

2003/0065481 A1 * 4/2003 Fujishima et al. ............ 702/182

FOREIGN PATENT DOCUMENTS

| JP | 2000-9412 | 1/2000 |
|---|---|---|
| JP | 2002-131037 | 5/2002 |
| JP | 2004-246408 | 9/2004 |

* cited by examiner

*Primary Examiner*—Manuel L Barbee
(74) *Attorney, Agent, or Firm*—Kilyk & Bowersox, P.L.L.C.

(57) ABSTRACT

First, it is confirmed that the contactor 1a is not damaged. Next, an initial preset signal PR is supplied at the state in which the contactor 1a is contacted to the master work MW. For this reason, CPU stores the reference value in EEPROM. If the timing signal is supplied at the state in which the contactor 1a is contacted to the non-defective object W, the CPU obtains the measurement value and corrects the measurement value by the reference value. When the difference between the reference value obtained during the measurement of the actual object W and the previous reference value stored in EEPROM is more than a predetermined value, it is judged that the contactor 1a is damaged, and warning signal is output. As this warning signal, the judgment signal Hi and the judgment signal Lo become from a low level to a high level.

7 Claims, 8 Drawing Sheets

CONTACT TYPE DISPLACEMENT METER

TECHNICAL FIELD

The present disclosure relates to a contact type displacement meter for measuring displacement amount of an object.

RELATED ART

A contact type displacement meter contacts to a surface of an object and includes a contactor (movable portion) capable of displacing in an axial direction and a transformer (for example, see Patent Document 1: Japanese Patent Unexamined Publication No. 2000-9412)

The transformer has a core interlocked with the contactor. Since the core is displaced by a displacement amount of the contactor, the level of signals output from the transformer is changed. In this configuration, since the physical displacement amount of the object is converted into an electric quantity, the physical displacement amount such as a height of the object is measured.

The contact type displacement meter is provided with a head section including the transformer and a main body section controlling the head section (for example, see Patent Document 2: Japanese Patent Unexamined Publication No. 2002-131037). External signals are input into the main body section from an external device such as PLC (Programmable Logic Controller). For this reason, the physical displacement amount of the object is measured at an input timing of the external signals.

A contactor that contacts with an object has a stretchable structure. As a result, for example, in case a frequency of use is high, the contactor is damaged, and it is likely not to stretch. Accordingly, the physical displacement amount of the object may be not correctly measured. Hereinafter, it will be concretely described.

Figure 8:
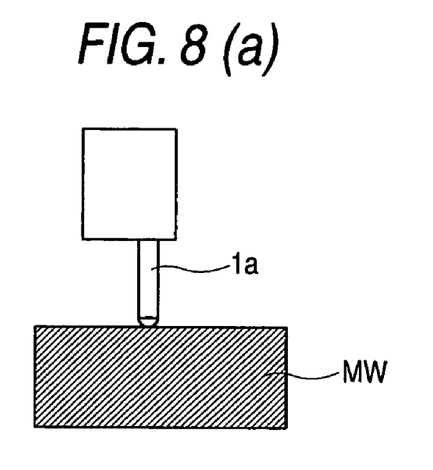
FIG. 8 is an explanatory diagram explaining the problems in the related art when the contactor of the contact type displacement meter is damaged.

FIG. 8 is an explanatory diagram explaining the problems in the related art when the contactor of the contact type displacement meter is damaged.

Generally, the contact type displacement meter has a function that can set a value measured at a reference position as a reference value by inputting a preset signal when the contactor is positioned at the reference position.

For example, as shown in FIG. 8(a), first, when a master work MW having a height of 5 mm with accuracy is measured, the measurement value is set as a reference value by inputting the preset signal, and subsequent measurement values are corrected.

For this reason, as shown in FIG. 8(b), when the object W having the height of 5.1 mm is measured, the measurement value of the object W to be measured, that is, 5.1 mm is exactly obtained.

However, as shown in FIG. 8(c), when the preset signal is input at a state in which the contactor 1a is not fully stretched at an original position due to the damage of the contactor 1a, the reference position means not the position in which the contactor 1a is contacted with the master work MW but the position in which the contactor 1a is not fully stretched. Therefore, an inaccurate reference value is set.

As a result, as shown in FIG. 8(d), in the measurement of the object W that does not have the height of shrinking of the contactor 1a, the measurement value becomes 5 nm.

In addition, for example, in case an investigating range is 5±0.5 mm, as described above, if the contactor 1a is damaged, the object W having the height of 5.1 mm should be normally judged as a defective product, but it is judged as a non-defective product. As a result, a user can obtain the erroneous judgment results.

SUMMARY

Embodiments of the present invention provide the contact type displacement meter that can sense the damage of the contactor 1a with a simple structure.

The contact type displacement meter according to one or more embodiments of the invention measures a physical displacement amount of an object and includes a contactor that stretches by coming in contact with the object; a conversion section that converts a displacement amount of the contactor into an electric quantity; a setting section that sets the electric quantity obtained by the conversion section as a reference value, when the reference value for judging whether the contactor is good or bad is set and when the reference value for correcting a measurement value of the displacement amount is set; a storage section that stores the reference value set by the setting section, when the reference value for judging whether the contactor is good or bad is set; a first judgment section that judges whether the contactor is good or bad by the difference between the reference value set by the setting section and the reference value stored in the storage section, when the reference value for correcting the measurement of the displacement amount is set; a first output section that outputs the judgment results by the first judgment section; and a correction section that obtains the electric quantity obtained by the conversion section as a measurement value and corrects the measurement value by using the reference value set by the setting section, when the displacement amount of the object is measured.

According to the contact type displacement meter of one or more embodiments of the invention, the contactor stretches by coming in contact with the object. The displacement amount of the contactor is converted into an electric quantity by the conversion section. When the reference value for judging whether the contactor is good or bad is set, the electric quantity obtained by the conversion section is set as a reference value by setting section, and the reference value set by the setting section is stored by storage section.

In addition, when the reference value for correcting a measurement value of the displacement amount is set, the electric quantity obtained by the conversion section is set as a reference value by the setting section, and a good or bad of the contactor is judged by first judgment section from the difference between the reference value set by the setting section and the reference value stored in the storage section. The judgment results by the first judgment section are output by first output section.

Furthermore, when the displacement amount of the object is measured, the electric quantity obtained by the conversion section is obtained as a measurement value by correction section, and the measurement value by using the reference value set by the setting section is corrected by correction section.

Therefore, since the good or bad of the contactor is judged from the difference between the reference value set by the setting section and the reference value stored in the storage section, it may be possible to recognize the good or bad of the contactor with a simple structure. In addition, user may easily recognize the good or bad of the contactor on the basis of the judgment results that are output from the first output section. Accordingly, an erroneous judgment is prevented, when the physical displacement amount of the object is measured.

The contact type displacement meter further includes a second judgment section that judges whether or not the measurement value corrected by the correction section is within an allowable range that is set beforehand; and a second output section that outputs the judgment results of the second judgment sections.

In this configurations the correction section judges whether or not the measurement value corrected by the correction section is within the allowable range that is set beforehand. The judgment results of the second judgment section is output by the second output section. For this reason, user may exactly recognize whether or not the physical displacement amount of the object is within the allowable range.

The first output section may output a first judgment signal that indicates the judgment results of the first judgment section, and the second output section may output a second judgment signal that indicates the Judgment results or the second judgment section.

In this configuration, the first judgment signal indicating the judgment results of the first judgment section is output by the first output section, and the second judgment signal indicating the judgment results of the second judgment section is output by the second output section. For this reason, it is possible to obtain each judgment signal indicating the respective of the judgment results.

The first output section and the second output section may be configured by a common output circuit that outputs a common judgment signal, and the common output circuit may represent the first judgment signal and the second judgment signal by a combination of logic levels of the common judgment signal.

In this configuration, since the first output section and the second output section may be configured by the common output circuit that outputs the common judgment signal, it may be possible to the contact type displacement meter of a small space and low cost. In addition, since the common output circuit may represent the first judgment signal and the second judgment signal by the combination of logic levels of the common judgment signal, it may be possible to obtain the respective of the judgment signals described above without increasing the signal line number.

The first output section may include a first display section that displays the judgment results of the first judgment section, and the second output section may include a second display section that displays the judgment results of the second judgment section.

In this configuration, the judgment results of the first judgment section are displayed by the first display section, and the judgment results of the second judgment section are displayed by the second display section. Accordingly, user may easily recognize the respective of the judgment results by viewing the first display section and the second display section.

The setting section may set the electric quantity obtained by the conversion section in response to a first external signal, as a reference value.

In this configuration, the electric quantity obtained by the conversion section in response to a first external signal is set as a reference value by the setting section. Therefore, the timing for setting the reference value may be determined by the first external signal.

The correction section may obtain the electric quantity obtained by the conversion section in response to a second external signal as a measurement value and may correct the measurement value by using the reference value set by the setting section.

In this configuration, the electric quantity obtained by the conversion section in response to the second external signal is obtained by the correction section as a measurement value. Moreover, the measurement value obtained by using the reference value set by the setting section in corrected by the correction section. Therefore, the timing for obtaining the measurement value corrected by using the reference value may be determined by the second external signal.

Various implementations may include one or more the following advantages. For example, a contact type displacement meter according to one or more embodiments of the invention can sense the damage of a contactor by a simple structure.

Other features and advantages may be apparent from the following detailed description, the accompanying drawings and the claims.

DETAILED DESCRIPTION

A contact type displacement meter according to an embodiment of the invention will be described hereinafter with reference to the accompanying drawings.

(1) Entire Configuration of Contact Type Displacement Meter

Figure 1:
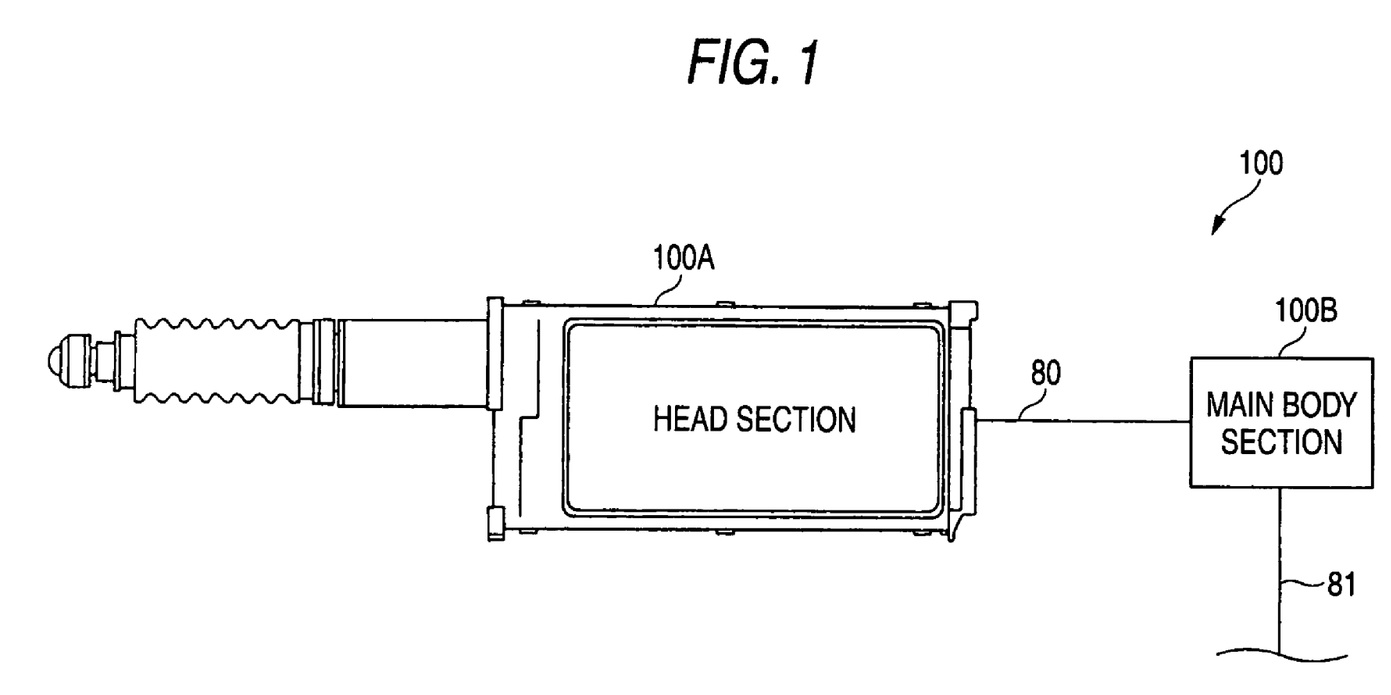
FIG. 1 is a block diagram showing a configuration of a contact type displacement meter according to an embodiment of the invention.

FIG. 1 is a block diagram showing a configuration of a contact type displacement meter according to an embodiment of the invention.

As shown in FIG. 1, the contact type displacement meter 100 according to the embodiment of the invention includes a head section 100A and a main body section 100B. In addition, even if it is not shown in FIG. 1 the main body section 100B has a display unit 32 to be described later. The display unit 32 will be described more fully below.

The head section 100A and the main body section 100B are connected to each other by a cable 80. In addition, the main body section 100B is connected to an external device not shown in FIG. 1 through the cable 81.

Figure 2:
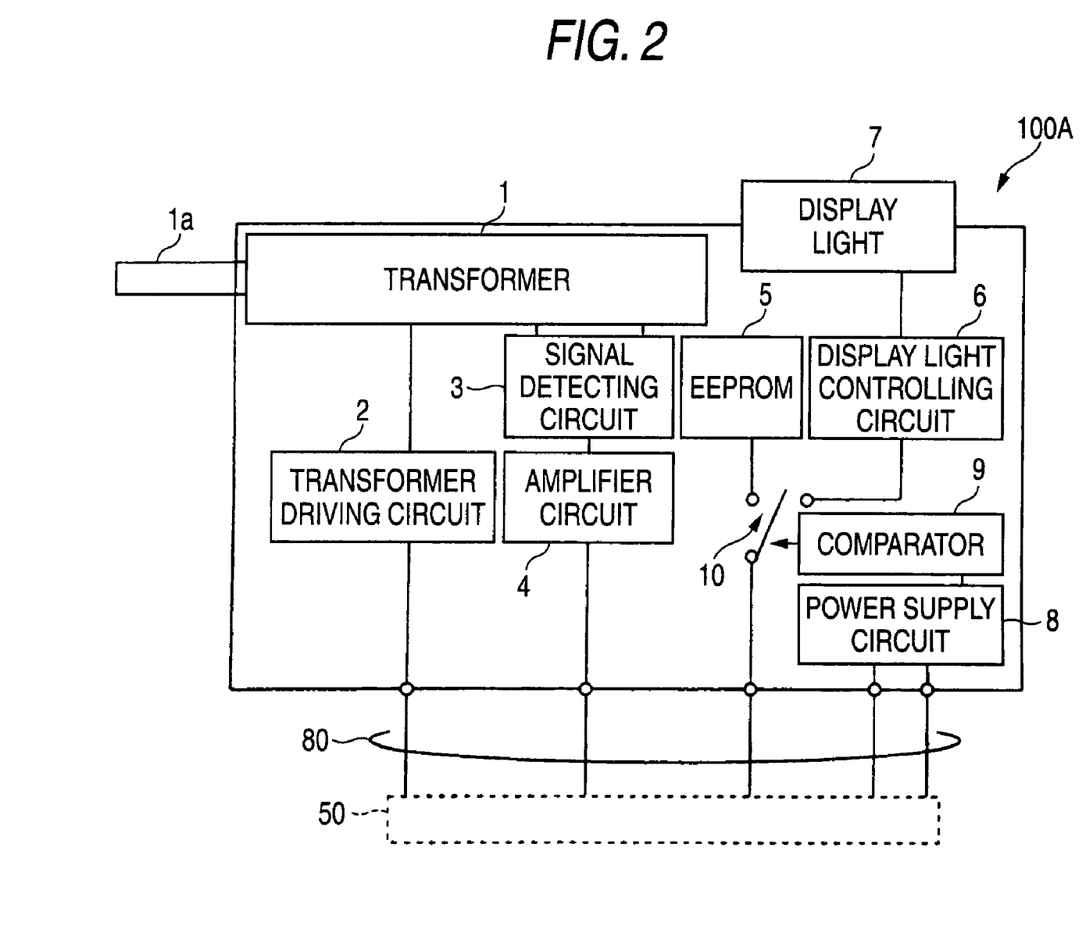
FIG. 2 is a block diagram showing of a configuration of the head section shown in FIG. 1.
Figure 3:
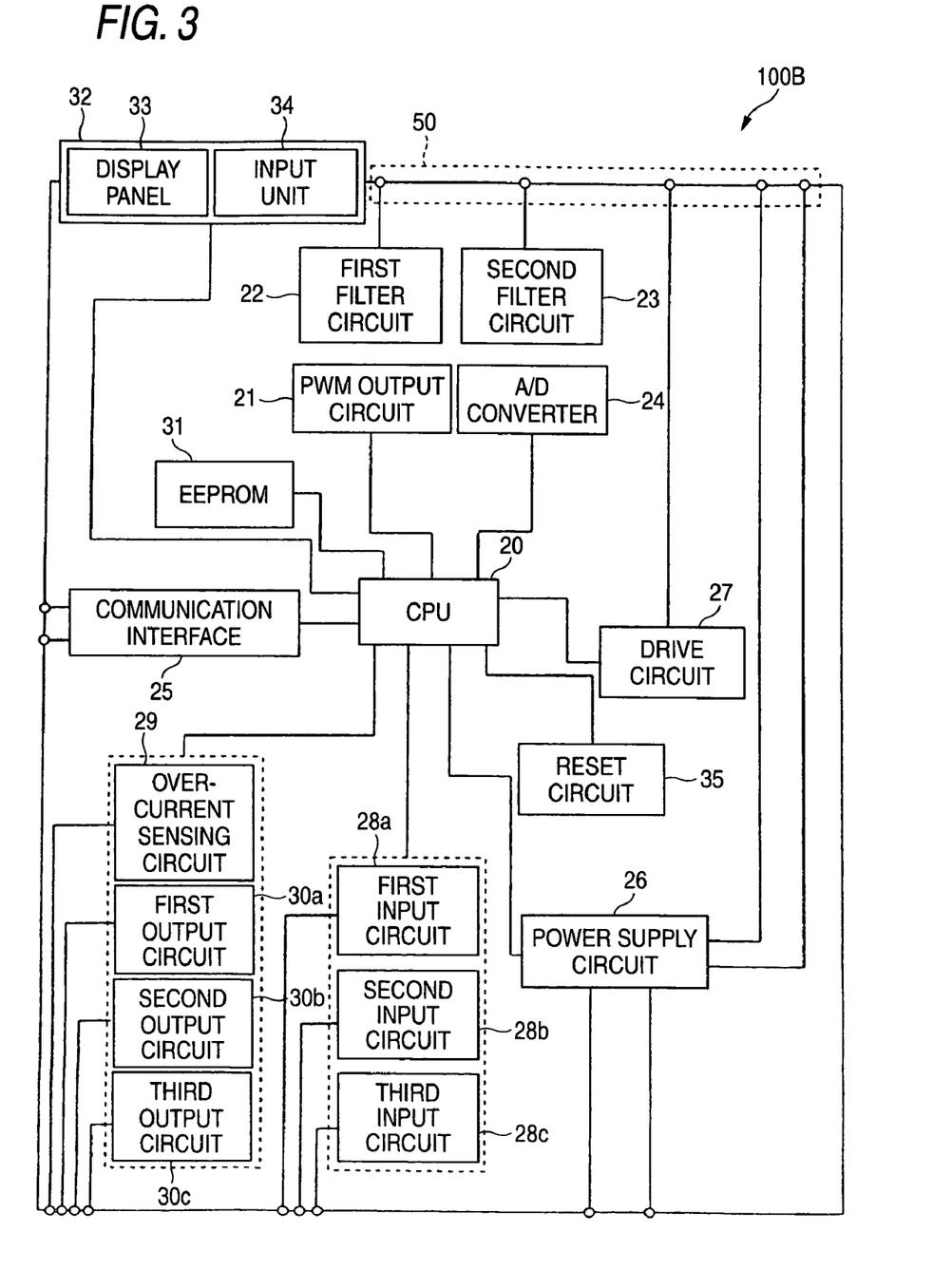
FIG. 3 is a block diagram showing a configuration of the main body section shown in FIG. 1.

FIG. 2 is a block diagram showing of a configuration of the head section 100A shown in FIG. 1, and FIG. 3 is a block diagram showing a configuration of the main body section 100B shown in FIG. 1.

As shown in FIG. 2, the head section 100A is provided with a transformer 1, a stretchable contactor 1*a* contacted to an object, a transformer driving circuit 2, a signal detecting circuit 3, an amplifier circuit 4, EEPROM (Electrically Erasable and Programmable Read Only Memory) 5, a display light controlling circuit 6, a display light 7, a power supply circuit 8, a comparator 9, and a switch 10.

Furthermore, as shown in FIG. 3, the main body section 100B is provided with CPU 20, a PWM (Pulse Width Modulation) output circuit 21, a first filter circuit 22, a second filter circuit 23, A/D (analog/digital) converter 24, a communication interface 25, a power supply circuit 26, a drive circuit 27, first to third input circuits 28a, 28b, and 28c, an over-current sensing circuit 29, first to third output circuits 30a, 30b, and 30c, EEPROM 31, a display unit 32, a display panel 33, an input unit 34, and a connection 50.

Signals are transmitted and received between the head section 100A and the main body section 100B through the cable 80. In this case, the cable 80 connected to the head section 100A is connected to the connection 50 of the main body section 100B.

In FIG. 3, first, CPU 20 provides a rectangular-wave pulse signal to the PWM output circuit 21 so as to operate the transformer 1. The PWM output circuit 21 converts the rectangular-wave pulse signal into a sine-wave signal. The first filter circuit 22 removes a noise of the sine-wave signal and provides the sine-wave signal in which the noise is removed to the transformer driving circuit 2 shown in FIG. 2.

The transformer driving circuit 2 provides a sine-wave current to the transformer 1 in response to the sine-wave signal. The configuration and operation of the transformer 1 will be described in detail below Subsequently, the transformer 1 provides two voltage signals (will be described below) to the signal detecting circuit 3. The signal detecting circuit 3 mutually subtracts the two voltage signals and provides a differential voltage to the amplifier circuit 4.

The amplifier circuit 4 conducts impedance conversion and provides the differential voltage to the second filter circuit. 23 (FIG. 3). The second filter circuit 23 converts the differential voltage into a direct-current voltage and provides the direct-current voltage to A/D converter 24

The A/D converter 24 converts the direct-Current voltage into a digital value and provides the converted results to the CPU 20 as a measurement value of the physical displacement amount. The CPU 20 controls, for example, the display unit 32 and the drive circuit 27 on the basis of the provided measurement value.

The signals may be transmitted and received between external devices such as a main body section of another contact type displacement meter, a personal computer or PLC (Programmable Logic Controller) (each of them is not shown) through the communication interface 25 of the main body section 100B. For example, in case of incorporating information into the PLC relative to the main body section 100B, the transmission and reception of information with the PLC are performed through the communication interface 25.

The power supply circuit 26 of the main body section 100B is, for example, connected to an external direct-current power supply (not shown) of 24 V. The power supply circuit 26 supplies to each component of the head section 100A through the power supply circuit 8 of the head section 100A and supplies to each component of the main body section 100B.

The drive circuit 27 supplies the current required for turning on or off the display light 7 of the head section 100A to the display light controlling circuit 6 through the switch 10.

At this time, the CPU 20 may switch a voltage level of the power supply circuit 8 of the head section 100A through the power supply circuit 26 of the main body section 100B. For example, the voltage level includes 8.5 V at a communication mode conducting during a start-up and 6.5 V at a normal operation mode.

The communication mode is a mode in which the CPU 20 receives correction information stored in the EEPROM 5 of the head section 100A, and the normal operation mode is a mode conducts in which the CPU 20 controls the display light controlling circuit 6 of the head section 100A to conduct the turning on and off of the display light 7. In addition, the correction information stored in the EEPROM 5 will be described below.

When the voltage level is 8.5 V on the basis of the switch of the voltage level of the power supply circuit 8 by the CPU 20, the comparator 9 of the head section 100A connects the switch 10 to the EEPROM 5 side. Meanwhile, when the voltage level is 6.5 V, the comparator 9 connects the switch 10 with the display light controlling circuit 6 side. According to this configuration, the communication mode and the normal operation mode are switched in the contact type displacement meter 100.

The first to third input circuits 28a, 28b, and 28c provide a predetermined signal input from the outside to the CPU 20. For example, the predetermined signal means a timing signal for instructing a measurement start and a preset signal for setting a reference position.

The first to third output circuits 30a, 30b, and 30c may output the signal to the outside on the basis of the physical displacement amount of the object in which the CPU 20 obtains depending on the differential voltage from the head section 100A and an allowable range having an upper limit value and a lower limit value that are preliminarily set.

Concretely, for example, the first output circuit 30a outputs a judgment signal having a predetermined level (for example, "H" level), when the physical displacement amount of the object exceeds the upper limit value of the allowable range. In addition, the second output circuit 30b outputs a judgment signal having a predetermined level (for example, "H" level), when the physical displacement amount of the object is within the allowable range. Further, the third output circuit 30c outputs a judgment signal having a predetermined level (for example, "H" level or "L" level), when the physical displacement amount of the object is below the lower limit value of the allowable range.

The over-current sensing circuit 29 monitors whether or not the current more than a rated current value flows into the first to third output circuits 30a, 30b, and 30c. When the current more than the rated current value flows into the respective of the first to third output circuits 30a, 30b, and 30c, the over-current sensing circuit 29 temporarily puts the output circuit into an OFF-state. Then, the CPU 20 regularly puts the output circuit into an ON-state, and the over-current sensing circuit 29 continues the monitor of the output circuit.

The EEPROM 31 of the main body section 100B stores the correction information. The correction information will be described below.

The display unit 32 displays the physical displacement amount of the object or the like by the control of the CPU 20. The display unit 32 includes the display panel 33 and the input unit 34. The display panel 33 and the input unit 34 will be described in detail with reference to the accompanying drawings below. A reset circuit 35 provides a reset signal to the CPU 20 on the basis of the actuation of user so as to reset the CPU 20 into an initial state.

At this time, if a frequency of use of the contactor 1a is high, the breakdown of the head section 100A frequently occurs. In this case, the main body section 100B is continuously used, and the head section 100A is newly exchanged.

First, a new head section 100A (hereinafter, simply referred to as "head section 100A") is attached to the main body section 100B. The CPU 20 of the main body section 100B communicates with the EEPROM 5 of the head section 100A at the communication mode.

The EEPROM 5 stores the correction information (hereinafter, referred to as "head correction information") of the head section 100A and the correction information (hereinafter, referred to as "master correction information") of the master main body section for testing to be described.

The head correction information is information for correcting differences in the relation (hereinafter, referred to as "displacement—output table") between the physical displacement amount of the object and the output value from the A/D converter 24 of the main body section 100B.

In addition, the master correction information is information for correcting differences in the displacement output table of the master main body section for testing, which is used for obtaining the head correction information.

The CPU 20 communicates with the EEPROM 5 so as to obtain the master correction information. Next, the CPU 20 communicates with EEPROM 31 of the main body section 100B.

The EEPROM 31 stores the correction information of the main body section 100B (hereinafter, referred to as "main body correction information").

The main body correction information is information for correcting differences in the relation between the level of the direct-current voltage converted by the second filter circuit 23 of the main body section 100B and the output value from the A/D converter 24.

The CPU 20 communicates with the EEPROM 31 so as to obtain the main body correction information. Moreover, the CPU 20 makes the same state as that using the master main body section for testing that becomes a reference, that is, the state that can recognize the correct physical displacement amount of the object from the A/D converter 24 on the basis of the obtained main body correction information and the master correction information.

Then, the CPU 20 communicates with the EEPROM 5 so as to obtain the head correction information. Therefore, the CPU 20 makes the state that can correctly recognize the relation between the level of the direct-current voltage of the second filter circuit 23 and the output value of the A/D converter 24. For this reason, even in case the head section 100A is exchanged, the main body section 100B can be made the same state as the master main body section that becomes a reference. Accordingly, it is possible to obtain the proper physical displacement amount of the object.

(2) Configuration of Transformer

Figure 4:
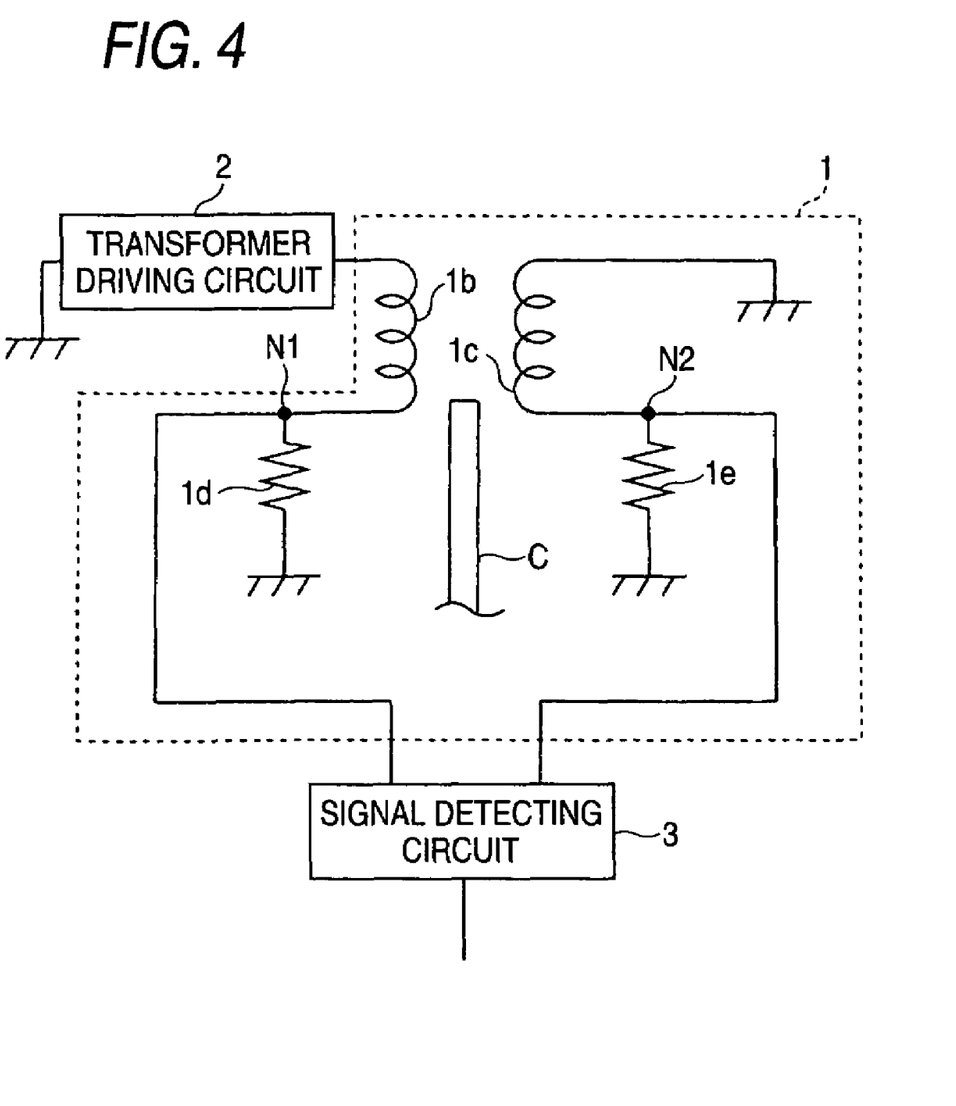
FIG. 4 is a pattern diagram showing in detail the configuration of the transformer.

Then, a configuration of the transformer 1 of the head section 100A will be described in detail with reference to the accompanying drawings.

FIG. 4 is a pattern diagram showing in detail the configuration of the transformer 1.

As shown in FIG. 4, the transformer 1 includes a core C provided with a primary coil 1b, a secondary coil 1c, a primary resistance 1d, a secondary resistance 1e, and a magnetic body. The core C is provided so as to be reciprocated within an area between the primary coil 1b and the secondary coil 1c by interlocking with the contactor 1a.

One end of the primary coil 1b is connected to the transformer driving circuit 2, and the other end thereof is connected to the signal detecting circuit 3. One end of the secondary coil 1c is connected to ground, and the other end thereof is connected to the signal detecting circuit 3. Winding directions of the primary coil 1b and the secondary coil 1c are opposite to each other.

One end of the primary resistance 1d is connected to a node N1 between the primary coil 1b and the signal detecting circuit 3, and the other end thereof is connected to the ground. One end of the secondary resistance 1e is connected to a node N2 between the secondary coil 1c and the signal detecting circuit 3, and the other end of the secondary resistance 1e is connected to the ground.

According to this configuration, the sine-wave current flows into the primary coil 1b from the transformer driving circuit 2, and an induction current flows into the secondary coil 1c in association with the flow of the sine-wave current. In this case, voltage drop is generated at the primary resistance 1d, and the voltage drop is also generated at the secondary resistance 1e. The voltage in the node N1 of one end of the primary resistance 1d and the voltage in the node N2 of one end of the secondary resistance 1e are supplied to the signal detecting circuit 3.

As described above, if the core C is moved at the state in which the induction current flows into the secondary coil 1c, mutual inductance between the primary coil 1b and the secondary coil 1c is changed. Therefore, the voltage of the node N2 is changed depending on the position of the core C.

The signal detecting circuit 3 computes the differential voltage between the voltage of the node N1 and the voltage of the node N2 and provides the differential voltage to the amplifier circuit 4. For this configuration, it is possible to detect the physical displacement amount of the object by converting the moving distance of the contactor 1a into the differential voltage.

In addition, according to the embodiment of the invention, since the winding direction of the primary coil 1b and the secondary coil 1c is an opposite direction in each other, resistance components of the primary coil 1b and the secondary coil 1c are mutually canceled. As described above, by canceling the resistance component having characteristics that is changed by a temperature, it is possible to accurately obtain the differential voltage without being affected by the temperature changes in the using place of the contact type displacement meter 100. As a result, a physical displacement amount of the object can be obtained accurately.

(3) Method of Sensing Damage of Contactor

A method of sensing damage of the contactor 1a will be described with reference to the accompanying drawings, when the contactor 1a is damaged.

The CPU 20 nets a digital value output from the A/D converter 24 as a reference value, when the preset signal is supplied to any of the first to third input circuits 28a to 28c from the outside. In addition, the CPU 20 obtains a digital value output from the A/D converter 24 as a measurement value and corrects the obtained measurement value by using the set reference value, when the timing signal is supplied to another any of the first to third input circuits 28a to 28c from the outside. For example, when the reference value corresponds to the physical displacement amount 0, the measurement value is corrected by subtracting the reference value from the measurement value.

FIG. 5 is an explanatory diagram explaining a sensing method of damage of the contactor 1a. In addition, FIG. 5 shows an example in which the preset signal is supplied from the outside every when the object W is measured.

FIG. 5 shows a preset signal PR consisting of a positive polarity pulse, a timing signal TM consisting of a positive polarity pulse, a judgment signal Hi indicating the case in which the physical displacement amount exceeds the upper limit value of the allowable range, a judgment signal Go indicating the case in which the physical displacement amount is within the allowable range, and a judgment signal Lo indicating the case in which the physical displacement amount is below the lower limit value of the allowable range.

Figures 5A, 5B, 5C, 5D, 5E, 5F, 5G, 5H, 5I:
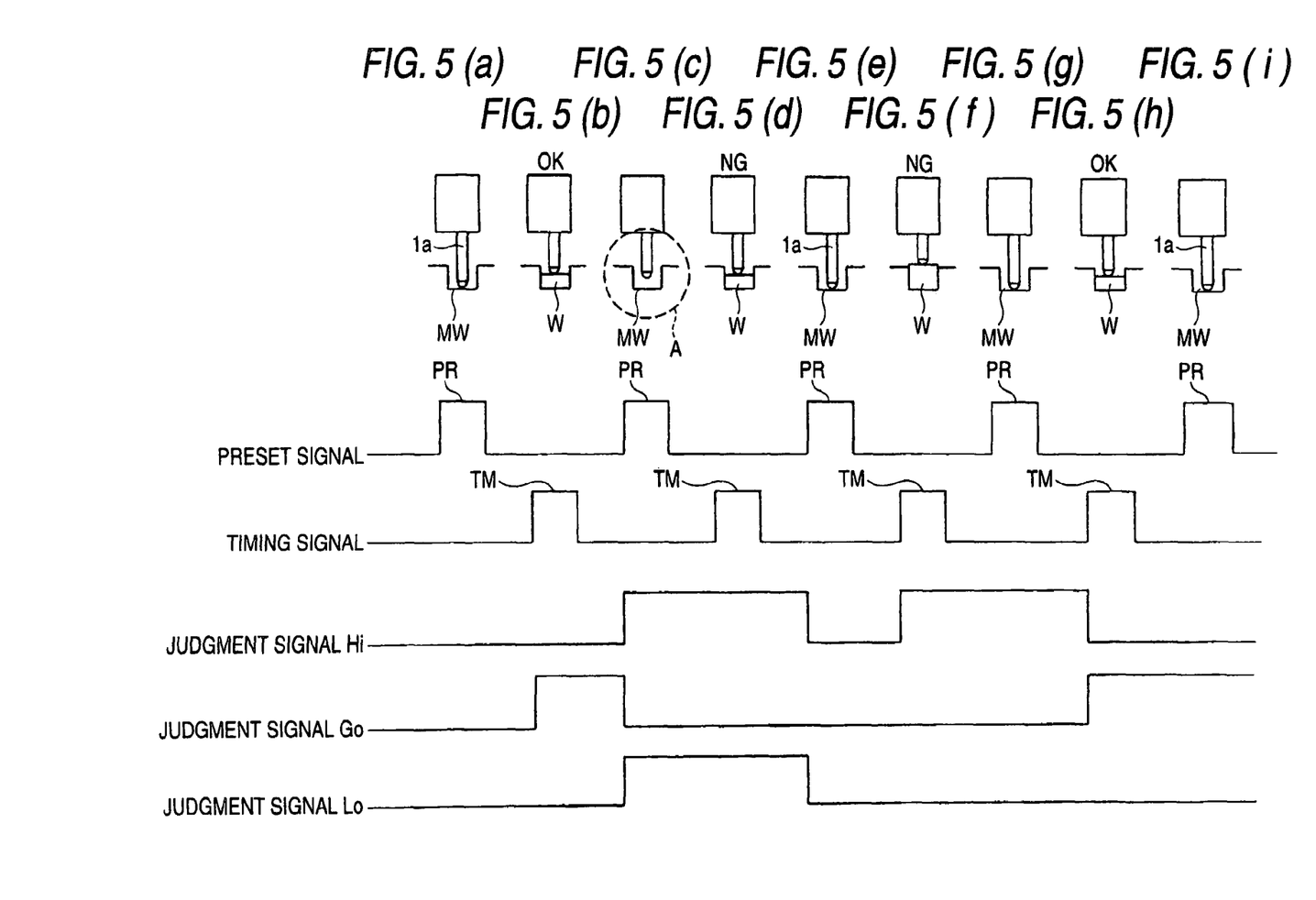
FIG. 5 is an explanatory diagram explaining a sensing method of damage of the contactor.

As shown in FIGS. 5(a), (c), (e), (g), and (i), the reference value is set by the preset signal PR that is input when the contactor 1a is at the position on the master work MW. In addition, as shown in FIGS. 5(b), (d), (f), and (h), the measurement value is obtained by the timing signal TM that is input when the contactor 1a is at the position on the object W.

Hereinafter, the sensing method according to the embodiment of the invention will be schematically described, and then the flow of the detailed processing by CPU 20 will be described with reference to a flowchart.

When the measurement value exceeds the upper limit value at a normal time, the judgment signal Hi output by the first output circuit 30a becomes a high level from a low level. In addition, when the measurement value is within the allowable range, the judgment signal Go output by the second output circuit 30b becomes a high level from a low level. Further, when the measurement value is below the lower limit value, the judgment signal Lo output by the third output circuit 30c becomes a high level from a low level.

In the sensing method according to the embodiment of the invention, it is confirmed beforehand that the contactor 1a is not damaged. Next, as shown in FIG. 5(a), an initial preset signal PR is supplied at the state in which the contactor 1a is contacted on the master work MW. For this reason, CPU 20 stores the reference value in EEPROM 31. In addition, the reference value may be stored in another storage section instead of EEPROM 31. As shown in FIG. 5(b), if the timing signal is supplied at the state in which the contactor 1a is contacted on the non-defective object W, CPU 20 obtains the measurement value and corrects the measurement value by the reference value.

As shown in FIGS. 5(e) and (g), the reference value is set in response to the preset signal PR at the state in which the contactor 1a is contacted on the master work MW. In this case, as shown in FIG. 5(f), when the height of the object W exceeds the upper limit value, the judgment signal Hi becomes a high level in response to the timing signal TM, and the object W is judged as a defective product NG. In addition, as shown in FIG. 5(h), when the height of the object W is within the allowable range, the judgment signal Go becomes a high level in response to the timing signal TM.

On the other hand, as shown in area A of FIG. 5(c), if the contactor 1a is damaged, when the preset signal PR is supplied at the state in which the contactor 1a is contacted to the master work MW, improper reference value in set. As a result, as shown in FIG. 5(d), even when the timing signal TM is supplied at the state in which the contactor 1a is contacted to the non-defective object W, the object W, which should be normally judged as a non-defective product, is judged as a defective product.

Here, in order to prevent the above erroneous judgment, when the difference between the reference value obtained during the measurement of the actual abject W and the previous reference value stored in EEPROM 31 is more than a predetermined value, it is judged that the contactor 1a is damaged, and a warning signal is output. According to the embodiment of the invention, as a warning signal, the judgment signal Hi and the judgment signal Lo become from a low level to a high level. Accordingly, user may recognize that the contactor 1a is damaged.

Figure 6:
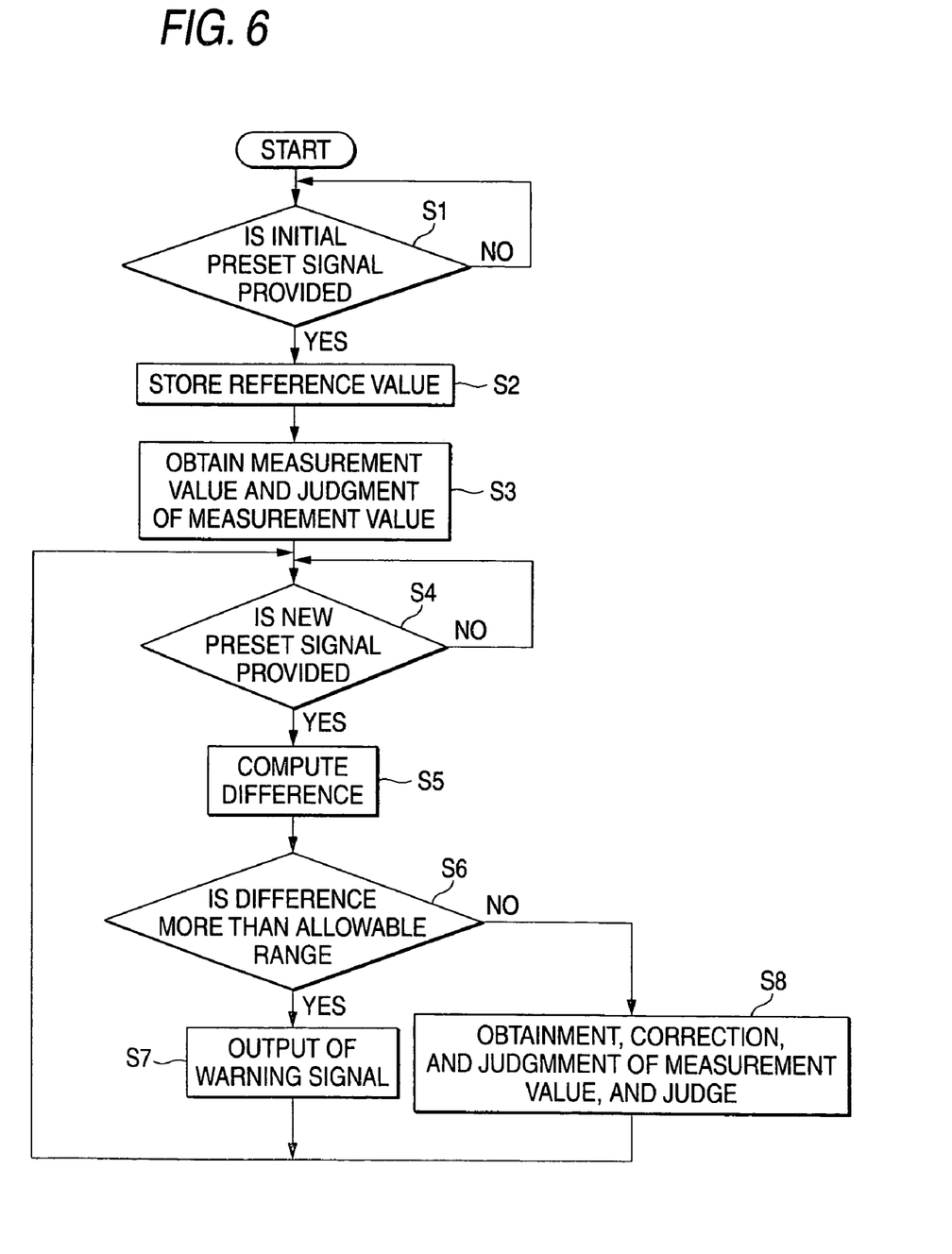
FIG. 6 is a flowchart showing damage sensing process by CPU.

FIG. 6 is a flowchart showing damage sensing process by CPU 20.

User confirms that the contactor 1a is not damaged and sets the reference value.

As shown in FIG. 6, the CPU 20 judges whether or not the initial preset signal PR is provided (step S1). When the initial preset signal PR is provided, the CPU 20 stores the digital value output from the A/D converter 24 in EEPROM 31 as a reference value (step 32). In addition, in step S1, when the initial preset signal PR is not provided, CPU 20 stands by until the initial preset signal PR is provided.

Next, the CPU 20 obtains the measurement value in response to the timing signal TM, corrects the measurement value by using the reference value, and performs the judgment based on the corrected measurement value (step S3). In this case, the CPU 20 outputs the judgment signals Hi, Go, and Lo indicating the judgment results from the first to third output circuits 30a, 30b, and 30c to the outside and displays the judgment results on the display panel 33.

Next, the CPU 20 judges whether or not new preset signal PR is provided (step S4). When the new preset signal PR is provided, the CPU 20 computes a difference between the present reference value and the reference value stored in EEPROM 31 (step S5). In addition, in step S4, when the new preset signal PR is not provided, CPU 20 stands by until the new preset signal PR is provided.

Subsequently, the CPU 20 judges whether or not the computed difference is more than the allowable value that is set beforehand (step S6). When the difference is more than the allowable value, the CPU 20 output a warning signal (step S7). According to the example of FIG. 5, the CPU 20 starts up both the judgment signal Hi and the judgment signal Lo, which are output from the first output circuit 30a and the third output circuit 30c, from a low level to a high level. Thereby, the user can recognize that damage is caused in the contactor 1a.

In addition, in step S6, when the computed difference is not more than the allowable value, the process is the same as that of step S3. That is, the CPU 20 obtains the measurement value in response to the timing signal TM, corrects the measurement value by using the reference value, and performs the judgment based on the corrected measurement value (step S8). After the process of steps S7 and S8, CPU 20 returns to the process of step S4 and repeats the process of steps S4 to S8.

(4) Configuration of Display Unit

Figure 7:
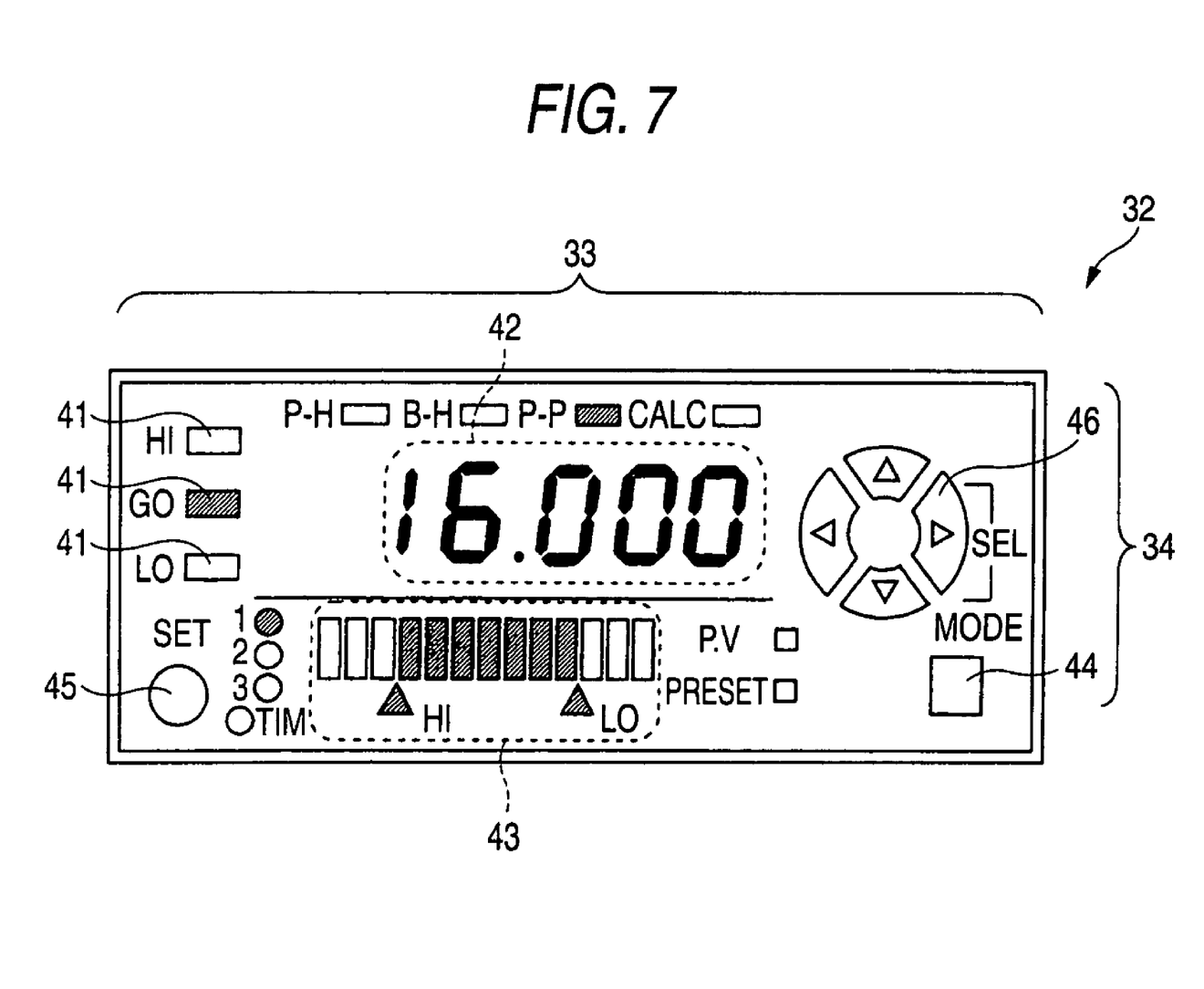
FIG. 7 is a pattern diagram showing a configuration of a display unit in a main body section.

A configuration of the display unit 32 in the main body section 100B will be described hereinafter with reference to the accompanying drawings.

FIG. 7 is a pattern diagram showing a configuration of a display unit 32 in a main body section 100B.

As shown in FIG. 7, the display unit 32 in the main body section 100B includes a display panel 33 and an input unit 34.

The display panel 33 includes three output displaying lights 41, seven-segments LED 42 and a bar shaped display unit 43. In addition, the input unit 34 includes a mode key 44, a set key 45, and a cross shaped key 46.

In a general mode displaying the measurement value, user may change a general mode into a setting mode by pushing the mode key 44, for example, for three seconds. Accordingly, a setting menu may be displayed on the seven-segments LED 42.

Furthermore, user may change setting items of the setting menu by manipulating the cross shaped key 46 from side to side and may change values of the setting items by manipulating up and down the cross shaped key 46. In addition, user may establish the values of the setting items by pushing the set key 45. The setting items include, for example, an upper limit value and a lower limit value for defining the allowable range and the allowable value for determining the difference between the reference values.

The seven-segments LED 42 displays the corrected measurement value or the like of the object. In addition, the seven-segments LED 42 displays, for example, "ERROR" for indicating the damage of the contactor 1a, when damage is caused in the contactor 1a.

Moreover, one of the output displaying lights 41 is turned on (HI lighting), when the measurement value exceeds the upper limit value, another of the output displaying lights 41 is turned on (G0 lighting), when the measurement value is within the allowable range, and the third of the output displaying lights 41 is turned on (L0 lighting), when the measurement value is below the lower limit value.

In addition, the bar shaped display unit 43 displays degrees of which the measurement value is contained in any position of the allowable range. Accordingly, user may easily recognize that the measurement value is the value near the lower limit value or the upper limit value or that whether or not a margin in the position of the measurement is within the allowable range.

(5) Effects According to the Embodiment of the Invention

According to the embodiment of the invention, the contact type displacement meter 100 stores the reference value in case that the initial preset signal PR is provided, and judges whether or not the contactor 1a is damaged on the basis of the difference between the stored reference value and a reference value in case that a subsequent preset signal PR is provided. Moreover, when the contactor 1a is damaged, a predetermined warning is executed. Therefore, user may recognize the damage of the contactor 1a. For this reason, the erroneous judgment is prevented.

In addition, according to the embodiment of the invention, since the warning is executed by a combination of the logic level of the judgment signals Hi and Lo, it is possible to prevent the erroneous judgment with a simple configuration without providing a particular configuration (6) Another Embodiment According to the above-described embodiment of the invention, the damage of the contactor 1a is warned by controlling such that both the judgment signal Hi and the judgment signal Lo output from the first output circuit 30a and the third output circuit 30c become a high level from a low level. However, this invention is not limited thereto, and may install another configuration outputting the signal that indicates the warning.

(7) Corresponding Relation Between Components of Claims and Each Unit of the Embodiment Hereinafter, the corresponding example between components of claims and each unit of the embodiment will be described, but the invention is not limited following example.

According to the above-described embodiment of the invention, the transformer 1 corresponds to conversion section, the input unit 34 corresponds to setting section, EEPROM 31 corresponds to storage section, and CPU 20 corresponds to first Judgment section, second judgment section, and correction section. In addition, the first to third output circuits 30a, 30b, and 30c correspond to first output section and second output section, the judgment signals Hi and Lo corresponds to a first judgment signal, the judgment signal Go corresponds to a second judgment signal, and the seven-segments LED 42 corresponds to first display section. Further, the output displaying light 41 and the bar shaped display unit 43 correspond to second display section, the preset signal corresponds to a first external signal, and the timing signal corresponds to a second external signal.

The contact type displacement meter according to the embodiment of the invention may be used for detecting the physical displacement amount of the object.

What is claimed is:

1. A contact type displacement meter that measures a physical displacement amount of an object, comprising:
a contactor that stretches by coming in contact with the object;
a conversion section that converts a displacement amount of the contactor into an electric quantity;
a setting section that sets the electric quantity obtained by the conversion section as a reference value, when the reference value for judging whether the contactor is good or bad is set and when the reference value for correcting a measurement value of the displacement amount is set;
a storage section that stores the reference value set by the setting section, when the reference value for judging whether the contactor is good or bad is set;
a first judgment section that judges whether the contactor is good or bad by the difference between the reference value set by the setting section and the reference value stored in the storage section, when the reference value for correcting the measurement of the displacement amount is set;
a first output section that outputs the judgment results by the first judgment section; and
a correction section that obtains the electric quantity obtained by the conversion section as a measurement value and corrects the measurement value by using the reference value for correcting said measurement value set by the setting section, when the displacement amount of the object is measured.

2. The contact type displacement meter according to claim 1 further comprising:
a second judgment section that judges whether or not the measurement value corrected by the correction section is within an allowable range that is set beforehand; and
a second output section that outputs the judgment results of the second judgment section.

3. The contact type displacement meter according to claim 2,
wherein the first output section outputs a first judgment signal that indicates the judgment results of the first judgment section, and
the second output section outputs a second judgment signal that indicates the judgment results of the second judgment section.

4. The contact type displacement meter according to claim 2,
wherein the first output section and the second output section are configured by a common output circuit that outputs a common judgment signal, and
the common output circuit represents the first judgment signal and the second judgment signal by a combination of logic levels of the common judgment signal.

5. The contact type displacement meter according to claim 2,
wherein the first output section includes a first display section that displays the judgment results of the first judgment section, and
the second output section includes a second display section that displays the judgment results of the second judgment section.

6. The contact type displacement meter according to claim 1,
wherein the setting section sets the electric quantity obtained by the conversion section in response to a first external signal, as said reference value.

7. The contact type displacement meter according to claim 1,
wherein the correction section obtains the electric quantity obtained by the conversion section in response to a second external signal as a measurement value and corrects the measurement value by using the reference value for correcting said measurement value set by the setting section.

* * * * *